(12) United States Patent
Xie et al.

(10) Patent No.: US 12,270,636 B1
(45) Date of Patent: Apr. 8, 2025

(54) STRAIN CALCULATION METHOD AND SYSTEM FOR PHASE-SENSITIVE OPTICAL COHERENCE ELASTOGRAPHY

(71) Applicant: Guangdong University of Technology, Guangdong (CN)

(72) Inventors: Shengli Xie, Guangdong (CN); Bo Dong, Guangdong (CN); Rui Wu, Guangdong (CN); Zihao Ni, Guangdong (CN); Yulei Bai, Guangdong (CN); Victor Fedorovich Kuzin, Guangdong (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/939,402

(22) Filed: Nov. 6, 2024

(30) Foreign Application Priority Data

Nov. 7, 2023 (CN) .......................... 202311469114.6

(51) Int. Cl.
G01B 11/16 (2006.01)
(52) U.S. Cl.
CPC ................................. G01B 11/161 (2013.01)

(58) Field of Classification Search
CPC .................................................... G01B 11/161
See application file for complete search history.

(56) References Cited

U.S. PATENT DOCUMENTS

| | | | |
|---|---|---|---|
| 2007/0150240 A1 | 6/2007 | Bridson | |
| 2015/0351722 A1 | 12/2015 | Chen et al. | |
| 2022/0299753 A1 | 9/2022 | Jian et al. | |

FOREIGN PATENT DOCUMENTS

| | | | | |
|---|---|---|---|---|
| CN | 112773335 A | 5/2021 | | |
| CN | 115186459 A | 10/2022 | | |
| CN | 116895349 A | 10/2023 | | |
| WO | 2021062362 A1 | 4/2021 | | |
| WO | WO-2022165902 A1 * | 8/2022 | ........... | A61B 5/0066 |

* cited by examiner

*Primary Examiner* — Christopher Wait (57) ABSTRACT

Disclosed is a strain calculation method and system for phase-sensitive optical coherence elastography (PhS-OCE), including the following steps: obtaining interference spectra for various states during sample deformation, and extracting spectral information including multiple amplitude maps and multiple phase maps from these interference spectra. In the present disclosure, the speckle decorrelation phenomenon in PhS-OCE can be eliminated, the measurement range is expanded, and tangential displacement fields and strain fields can be measured by PhS-OCE technique while ensuring high axial sensitivity in strain measurement.

7 Claims, 5 Drawing Sheets

STRAIN CALCULATION METHOD AND SYSTEM FOR PHASE-SENSITIVE OPTICAL COHERENCE ELASTOGRAPHY

TECHNICAL FIELD

The present disclosure relates to the technical field of phase-sensitive optical coherence elastography (PhS-OCE), and in particular to a strain calculation method and system for PhS-OCE.

BACKGROUND

As a non-invasive imaging technique, PhS-OCE serves for studying the mechanical property of biological tissues or materials, especially for studying elastic characteristics. Combining optical coherence tomography (OCT) with elastography, PhS-OCE is capable of acquiring chromatographic strain fields within samples in a high resolution, thus analyzing the elastic information of the samples.

The basic principle of PhS-OCE involves that OCT method is employed to measure interference signals of light to obtain structural information within samples, and the strain of the samples is detected by applying external force or strain. This technique mainly relies on measuring the phase difference information of light, so as to capture tiny displacement and strain within the samples. By analyzing the phase changes before and after applying force, high-resolution tomographic strain fields can be generated by PhS-OCE, so that the distribution of elastic parameters such as elastic modulus and shear modulus can be calculated.

This technique is widely applied in biomedical domain, such as, for observing and diagnosing tissue diseases, studying microstructures and mechanical property within organisms, and monitoring changes in material elastic properties. It can also be applied for measuring skin elasticity, observing deformation characteristics of tumors, and studying elastic changes in ocular tissues. This technique helps to enhance the understanding and diagnostic capabilities in biomedical and materials science research while protecting samples from being damaged, and therefore, it is of great value in medical and life science research.

However, this technique risks two key challenges currently: 1) pixel-level displacement can lead to speckle decorrelation phenomenon, limiting the measurement range of this technique; and 2) the interference phase is only sensitive to axial displacement and strain, and the tangential displacement and strain field fails to be detected.

SUMMARY

An objective of the present disclosure is to provide a strain calculation method for PhS-OCE to overcome the deficiencies existing in the prior art. By using this method, the speckle decorrelation phenomenon in PhS-OCE can be eliminated, the measurement range is expanded, and tangential displacement fields and strain fields can be measured by PhS-OCE technique while ensuring high axial sensitivity in strain measurement.

To achieve the above objective, the present disclosure provides the following technical solutions:

a strain calculation method for PhS-OCE includes:

obtaining interference spectra for various states during sample deformation, and extracting spectral information including multiple amplitude maps and multiple phase maps from these interference spectra;

performing, based on image correlation matching, subpixel displacement tracking on various pixels in regions of interest (ROIs) of the multiple amplitude maps to obtain corresponding tangential displacement fields and axial displacement fields;

obtaining corresponding differential phase fields based on the multiple phase maps and combined with pixel-level displacement offsets; and calculating tangential strain fields and axial strain fields by combining the tangential displacement fields, the axial displacement fields, and the differential phase fields.

Further, the performing, based on image correlation matching, subpixel displacement tracking on various pixels includes:

dividing ROIs of reference amplitude maps before deformation of the desired state of the sample into virtual grids evenly, and calculating the displacement of various grid points through subset matching;

the process of calculating the displacement of a grid point P including:

selecting a reference subregion with $(2M+1) \times (2M+1)$ pixel centered at $(y_0, z_0)$ from the reference amplitude map before deformation of the desired state of the sample, for tracking a corresponding target subregion in the deformed amplitude map after deformation of the desired state of the sample;

using, for tracking the target subregion, a cross-correlation criterion to estimate the degree of similarity between a reference subset and a target subset, with the formula as follows:

$$C_{ZNCC} = \frac{\sum_{i,j}(AR_{ij} - \mu_{AR}) \cdot (AD_{ij} - \mu_{AD})}{\sqrt{\sum_{i,j}(AR_{ij} - \mu_{AR})^2 \cdot \sum_{i,j}(AD_{ij} - \mu_{AD})^2}}$$

where $AR_{ij}$ and $AD_{ij}$ represent pixel values of the reference subset and the deformed subregion, respectively; and $\mu_{AR}$ and $\mu_{AD}$ represent average pixels of the reference subregion and the deformed subregion, respectively; and obtaining the displacement of the grid point P after finding a target subregion with the highest similarity.

Further, a formula for calculating corresponding differential phase fields based on the multiple phase maps and combined with pixel-level displacement offsets is as follows:

$$\Delta\phi(y, z) = \tan^{-1}\left(\frac{\cos R \sin D - \sin R \cos D}{\sin R \sin D + \cos R \cos D}\right)$$

where $R = \varphi_R(y, z)$ represents a reference phase map before the deformation of the desired state of the sample;

$D = \varphi_D(y+\text{round}(V), z+\text{round}(w))$ represents a deformed phase map after the deformation of the desired state of the sample, v and w being displacements along y axis and x axis, respectively; and $\text{round}(\cdot)$ represents that the number is rounded to the nearest whole number.

Further, a formula for calculating tangential strain fields and axial strain fields by combining the tangential displacement fields, the axial displacement fields, and the differential phase fields is as follows:

$$\begin{cases} \varepsilon_{yy}(y, z) = \dfrac{\partial v(y, z)}{\partial y} \\ \varepsilon_{zz}(y, z) = \dfrac{\partial w(y, z)}{\partial z} = \dfrac{\lambda_c}{4\pi n} \cdot \dfrac{\partial \Delta \phi(y, z)}{\partial z} \end{cases}$$

where $\varepsilon_{yy}$ (y, z) represents the tangential strain field, $\varepsilon_{zz}$(y, z) represents the axial strain field, v(y, z) represents the tangential displacement field, w(y, z) represents the axial displacement field, $\lambda_c$ represents a central wavelength of an OCT system, and n represents a refractive index of a measured object.

To achieve the above objective, the present disclosure provides a strain calculation system for PhS-OCE, applied for implementing the strain calculation method for PhS-OCE described above, including a spectral information extraction module, a subpixel displacement tracking module, a differential phase field calculation module, and a strain field calculation module.

The spectral information extraction module is configured to obtain interference spectra for various states during sample deformation, and extract spectral information including multiple amplitude maps and multiple phase maps from these interference spectra;

the subpixel displacement tracking module is configured to perform subpixel displacement tracking on various pixels in ROIs of the multiple amplitude maps to obtain corresponding tangential displacement fields and axial displacement fields;

the differential phase field calculation module is configured to obtain corresponding differential phase fields based on the multiple phase maps and combined with pixel-level displacement offsets; and the strain field calculation module is configured to calculate tangential strain fields and axial strain fields by combining the tangential displacement fields, the axial displacement fields, and the differential phase fields.

Further, the spectral information extraction module is an OCT system.

Compared with the prior art, the principles and advantages of the solutions are as follows.

1. The image correlation matching is used as a preprocessing means for PhS-OCE, and axial and tangential displacement fields are obtained from the amplitude spectra collected before and after deformation, so that the problem of differential phase mismatch is solved and speckle decorrelation phenomenon is eliminated.

2. By combining the image correlation matching and phase methods, the strain field reconstruction in PhS-OCE is achieved. The tangential displacement field obtained through image correlation matching can not only be applied to solve the problem of differential phase mismatch, but also directly reflect the tangential strain within materials through gradient calculation.

BRIEF DESCRIPTION OF THE DRAWINGS

To state the technical solution of the embodiment in the present disclosure or the prior art clearer, a brief introduction to the attached drawings needed in the embodiment or prior art is stated below. Obviously, the drawings described below are some embodiments in the present disclosure, for those skilled in the art, other drawings can be obtained according to these drawings without creative efforts.

DETAILED DESCRIPTION

The present disclosure is further described in combination with the specific embodiment.

A strain calculation system for PhS-OCE provided in the embodiment includes a spectral information extraction module, a subpixel displacement tracking module, a differential phase field calculation module, and a strain field calculation module.

Specifically, in this embodiment, the spectral information extraction module is an OCT system.

Figure 1:
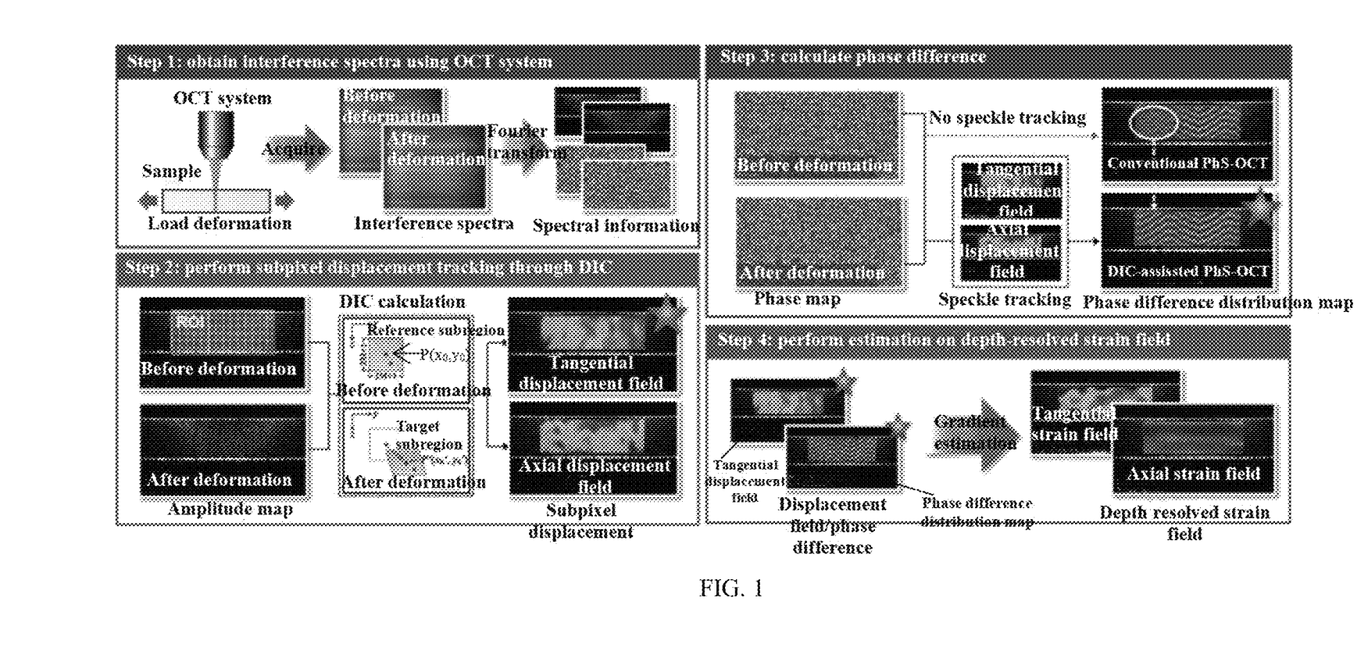
FIG. 1 is a flowchart showing a principle of a strain calculation method for PhS-OCE according to the present disclosure.

As shown in FIG. 1, the operation principle of the system is as follows.

Step 1, interference spectra for various states during sample deformation are obtained through the OCT system, and spectral information including multiple amplitude maps and multiple phase maps are extracted from these interference spectra. Since the interference spectra correspond to the frequencies along the wavenumber axis related to the sample depth z, the amplitude reflects the intensity of the reflected light, and the amplitude maps provide cross-sectional information of the sample.

Step 2, subpixel displacement tracking is performed on various pixels in ROIs of the multiple amplitude maps using digital image correlation (DIC) through the subpixel displacement tracking module, to obtain corresponding tangential displacement fields and axial displacement fields.

Specifically, this step includes the following.

ROIs of reference amplitude maps before deformation of the desired state of the sample are divided into virtual grids evenly, and the displacement of various grid points is calculated through subset matching.

Taking a grid point P as an example, calculating the displacement of the grid point P includes the following process.

A reference subregion with (2M+1)×(2M+1) pixel centered at ($y_0$, $z_0$) is selected from the reference amplitude map before deformation of the desired state of the sample, for tracking a corresponding target subregion in the deformed amplitude map after deformation of the desired state of the sample.

For tracking the target subregion, a cross-correlation criterion is employed to estimate the degree of similarity between a reference subset and a target subset, with the formula as follows:

$$C_{ZNCC} = \dfrac{\sum_{i,j}(AR_{ij} - \mu_{AR}) \cdot (AD_{ij} - \mu_{AD})}{\sqrt{\sum_{i,j}(AR_{ij} - \mu_{AR})^2 \cdot \sum_{i,j}(AD_{ij} - \mu_{AD})^2}}$$

where $AR_{ij}$ and $AD_{ij}$ represent pixel values of the reference subset and the deformed subregion, respectively;

and $\mu_{AR}$ and $\mu_{AD}$ represent average pixels of the reference subregion and the deformed subregion, respectively.

The displacement of the grid point P is obtained after finding a target subregion with the highest similarity.

The corresponding tangential displacement field v(y,z) and axial displacement field w(y,z) can be obtained after the aforementioned calculation is performed on each pixel in the amplitude map.

Step 3, based on the multiple phase maps and combined with pixel-level displacement offsets, corresponding differential phase fields are obtained through the differential phase field calculation module. The calculation formula is as follows:

$$\Delta\phi(y, z) = \tan^{-1}\left(\frac{\cos R \sin D - \sin R \cos D}{\sin R \sin D + \cos R \cos D}\right)$$

where $R=\varphi_R(y, z)$ represents a reference phase map before the deformation of the desired state of the sample; and $D=\varphi_D(Y+\text{round}(V), z+\text{round}(w))$ represents a deformed phase map after the deformation of the desired state of the sample, v and w being displacements along y axis and x axis; and round(·) represents that the number is rounded to the nearest whole number (in existing method, pixel-level displacement offsets round(v) and round(w) are not considered. Therefore, when the displacement or deformation of the measured object is relatively large, inaccurate phase difference calculations may occur due to the decorrelation phenomenon shown in step 3 of FIG. 1. However, after applying the method described in this patent, pixel-level offsets can be obtained, enabling pixel-level offset compensation in phase difference calculations, overcoming the decorrelation phenomenon, and ultimately achieving accurate phase difference calculation).

Step 4, tangential strain fields and axial strain fields are calculated through the strain field calculation module by combining the tangential displacement fields, the axial displacement fields, and the differential phase fields. The calculation formula is as follows:

$$\begin{cases} \varepsilon_{yy}(y, z) = \dfrac{\partial v(y, z)}{\partial y} \\ \varepsilon_{zz}(y, z) = \dfrac{\partial w(y, z)}{\partial z} = \dfrac{\lambda_c}{4\pi n} \cdot \dfrac{\partial \Delta\phi(y, z)}{\partial z} \end{cases}$$

where $\varepsilon_{yy}(y, z)$ represents the tangential strain field, $\varepsilon_{zz}(y, z)$ represents the axial strain field, v(y, z) represents the tangential displacement field, w(y, z) represents the axial displacement field, λe represents a central wavelength of an OCT system, and n is a refractive index of a measured object.

It is to be noted that although the axial displacement can also be obtained using the image correlation matching method described in step 2, and the axial strain can be obtained through gradient calculation, this method can only achieve low-sensitivity axial strain reconstruction. The sensitivity of the axial strain obtained by combining the image correlation matching method with the phase method is two orders of magnitude higher than that obtained solely by the image correlation matching method.

To prove the effectiveness and superiority of the method of the present disclosure, the following simulation experiments are conducted.

1) An OCT system with tangential and axial resolutions of 18 m and 8 m, respectively, was employed to acquire interference spectra from a thin polymer film at each state during stretching. The stretching direction of the film was aligned with the tangential direction of the OCT system. The length, thickness, and refractive index of the film were 120 mm, 0.61 mm, and 1.42, respectively. After preloading, the length of the film was approximately 80 mm.

Figure 2:
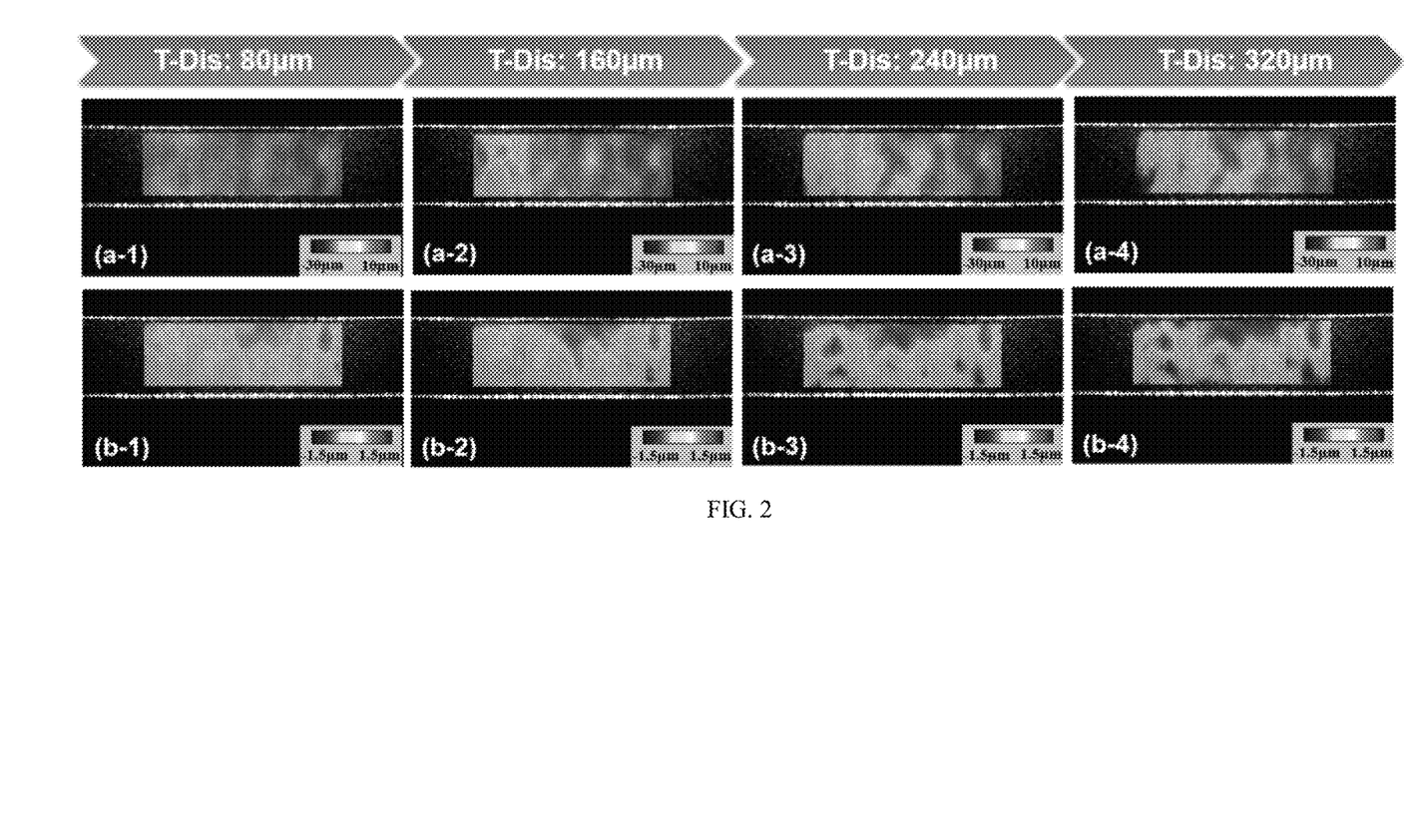
FIG. 2 illustrates the subpixel displacement field tracking results based on image correlation matching in a simulation experiment.

2) The interference spectra collected at different tensile displacements (T-Dis) were subjected to Fourier transform to obtain amplitude spectra, which were subjected to subpixel displacement tracking using step 2 described above, so that the tangential and axial displacement fields as shown in FIG. 2 were obtained. In FIG. 2, series a represents tangential displacement fields, and series b represents axial displacement fields.

Figure 3:
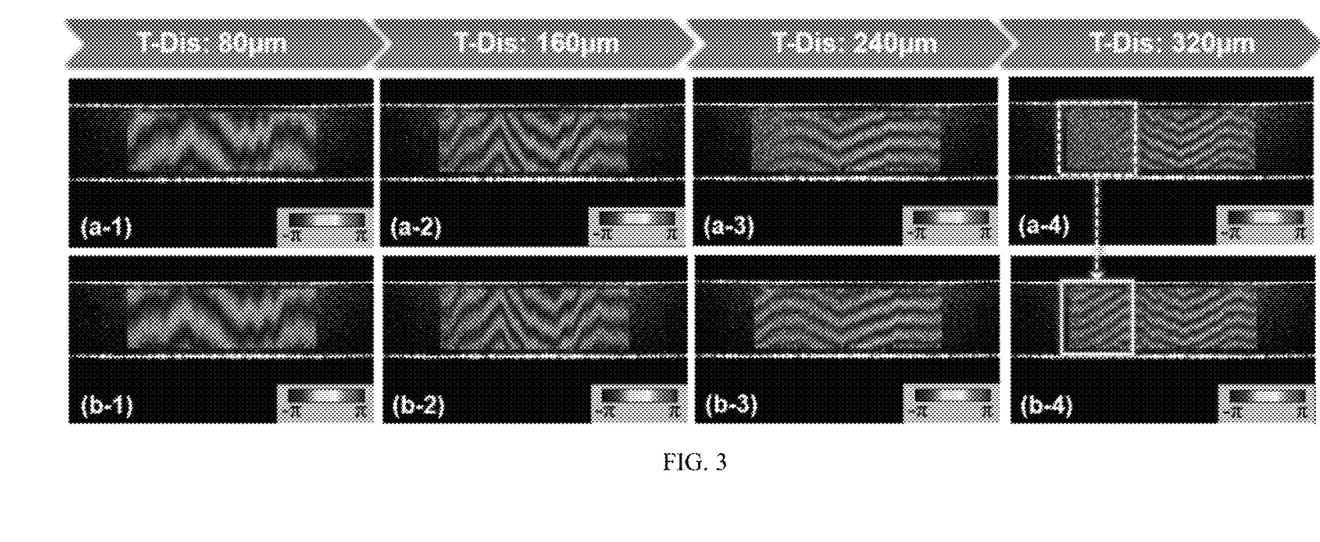
FIG. 3 compares the differential phase calculation results obtained using the existing PhS-OCE method with those obtained using the method of the present disclosure in a simulation experiment.

3) After the subpixel displacement tracking, a phase difference map could be obtained using the differential phase calculation method described in step 3, as shown in FIG. 3. It can be seen from series a of FIG. 3 (differential phase calculation results obtained based on the existing PhS-OCE method) that differential phase mismatch phenomenon occurs on the left side of the film when the tensile displacement reaches 240 m. It can be seen from series b of FIG. 3 (differential phase calculation results obtained using the method of the present disclosure) that the mismatch phenomenon can be eliminated after the pixel-level displacement offsets are compensated with the displacement results tracked by image correlation matching, allowing for accurate estimation of the phase difference values.

Figure 4:
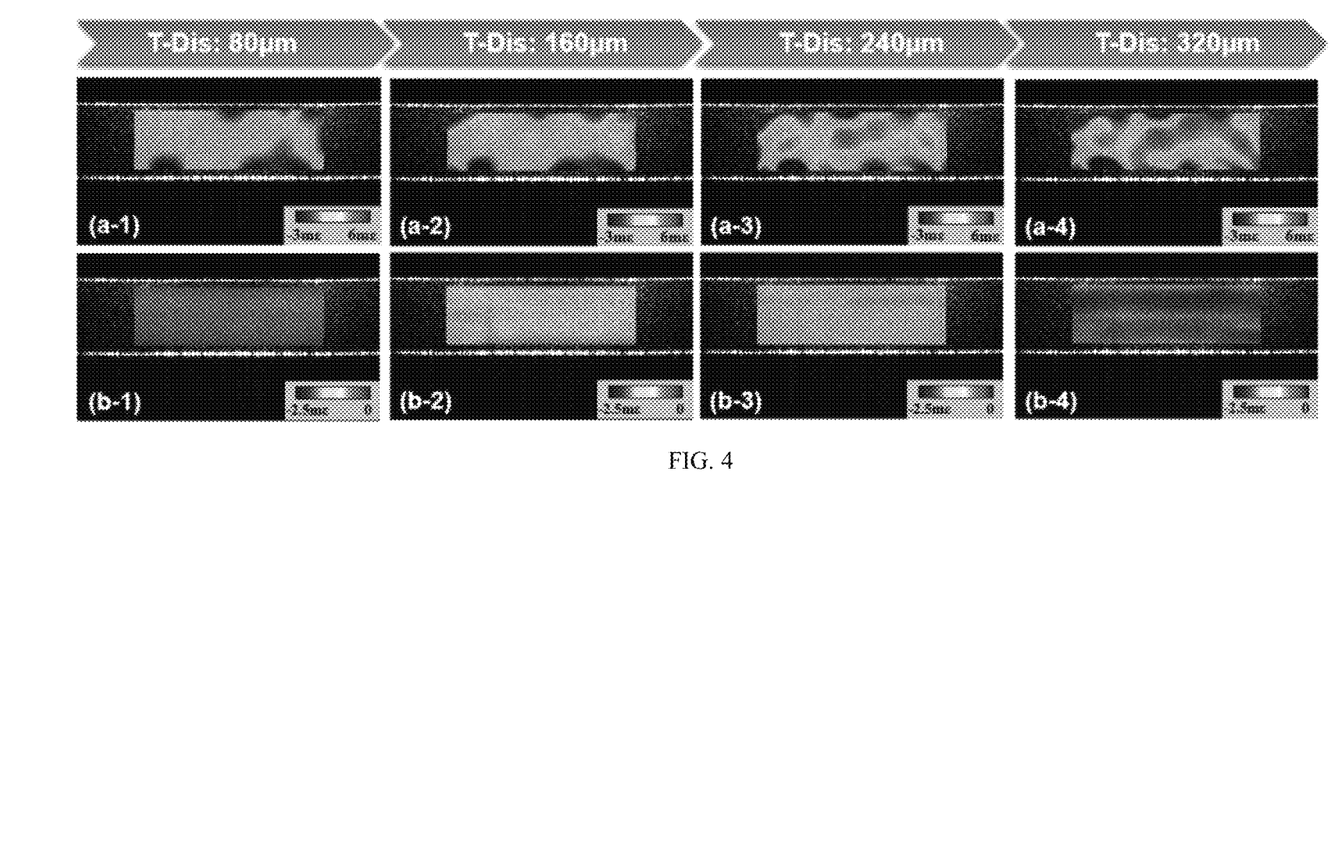
FIG. 4 shows the calculation results of a tomographic strain field in a simulation experiment.

4) Utilizing the strain calculation method described in step 4, the strain field could be obtained by estimating the displacement/phase gradients. The tangential strain shown in series a of FIG. 4 is the calculation result by estimating the tangential gradient from the tangential displacement field shown in series a of FIG. 2. The axial strain shown in series b of FIG. 4 is the calculation result by estimating the axial gradient from the phase difference map shown in series b of FIG. 3.

Figure 5:
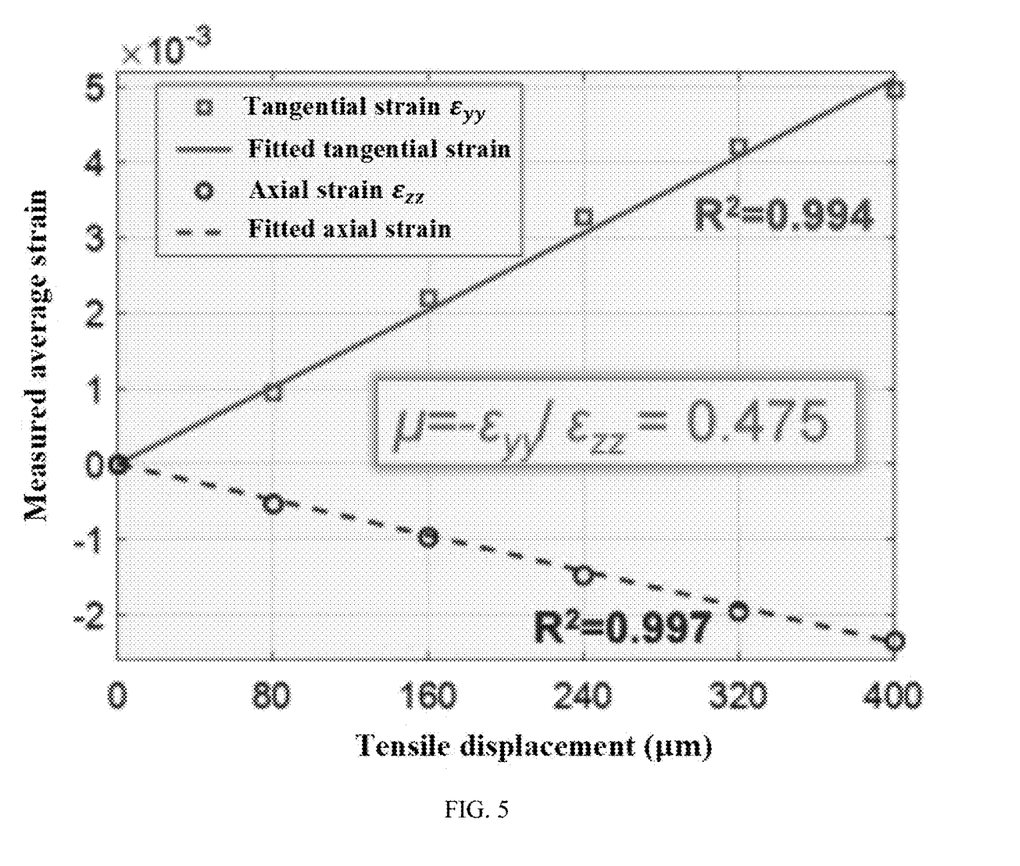
FIG. 5 is a schematic diagram showing the average strain measured under different tensile displacements in a simulation experiment.

5) After obtaining the strain fields at different tensile displacements, their average values could be calculated, as shown in FIG. 5. It is observed from FIG. 5 that both the tangential and axial strains have good linear relationship with tensile displacement. Through linear regression analysis, it is determined that due to the high sensitivity of the interference phase, a higher coefficient of determination $R^2$ is generated in the axial strain fitting process. Based on the measured tangential and axial strains, the Poisson's ratio of the material can be further estimated, i.e., $\mu=-\varepsilon_{yy}/\varepsilon_{zz}=0.475$, which is consistent with the reference value.

It is evident from the above simulation experiments that the method described in the present disclosure uses image correlation matching as a preprocessing means for PhS-OCE, and axial and tangential displacement fields can be obtained from the amplitude spectrum collected before and after deformation, thereby solving the problem of differential phase mismatch. By combining image correlation matching with phase methods, strain field reconstruction in PhS-OCE is achieved. The tangential displacement field obtained through image correlation matching can not only be applied to solve the problem of differential phase mismatch, but also directly reflect the tangential strain within the material through gradient calculation.

The above embodiment is only preferred embodiment of the present disclosure, and is not intended to limit the scope of implementation of the present disclosure. Therefore, any changes made in accordance with the shape and principle of the present disclosure shall be covered by the scope of protection of the present disclosure.

The invention claimed is:

1. A strain calculation method for phase-sensitive optical coherence elastography (PhS-OCE), comprising:
obtaining interference spectra for various states during sample deformation, and extracting spectral information comprising multiple amplitude maps and multiple phase maps from these interference spectra;
performing, based on image correlation matching, subpixel displacement tracking on various pixels in regions of interest (ROIs) of the multiple amplitude maps to obtain corresponding tangential displacement fields and axial displacement fields;
obtaining corresponding differential phase fields based on the multiple phase maps and combined with pixel-level displacement offsets; and
calculating tangential strain fields and axial strain fields by combining the tangential displacement fields, the axial displacement fields, and the differential phase fields;
the performing, based on image correlation matching, subpixel displacement tracking on various pixels comprising:
dividing ROIs of reference amplitude maps before deformation of the desired state of the sample into virtual grids evenly, and calculating the displacement of various grid points through subset matching;
the process of calculating the displacement of a grid point P comprising:
selecting a reference subregion with (2M+1)×(2M+1) pixel centered at ($y_0$, $z_0$) from the reference amplitude map before deformation of the desired state of the sample, for tracking a corresponding target subregion in the deformed amplitude map after deformation of the desired state of the sample;
using, for tracking the target subregion, a cross-correlation criterion to estimate the degree of similarity between a reference subset and a target subset, with the formula as follows:

$$C_{ZNCC} = \frac{\sum_{i,j}(AR_{ij} - \mu_{AR}) \cdot (AD_{ij} - \mu_{AD})}{\sqrt{\sum_{i,j}(AR_{ij} - \mu_{AR})^2 \cdot \sum_{i,j}(AD_{ij} - \mu_{AD})^2}}$$

where $AR_{ij}$ and $AD_{ij}$ represent pixel values of the reference subset and the deformed subregion, respectively; and $\mu_{AR}$ and $\mu_{AD}$ represent average pixels of the reference subregion and the deformed subregion, respectively; and
obtaining the displacement of the grid point P after finding a target subregion with the highest similarity.

2. The strain calculation method for PhS-OCE according to claim 1, wherein a formula for calculating corresponding differential phase fields based on the multiple phase maps and combined with pixel-level displacement offsets is as follows:

$$\Delta\phi(y, z) = \tan^{-1}\left(\frac{\cos R \sin D - \sin R \cos D}{\sin R \sin D + \cos R \cos D}\right)$$

where $R = \phi_R(y, z)$ represents a reference phase map before the deformation of the desired state of the sample; $D = \phi_D(y+\text{round}(V), z+\text{round}(w))$ represents a deformed phase map after the deformation of the desired state of the sample, v and w being displacements along y axis and x axis, respectively; and round(·) represents that the number is rounded to the nearest whole number.

3. The strain calculation method for PhS-OCE according to claim 1, wherein a formula for calculating tangential strain fields and axial strain fields by combining the tangential displacement fields, the axial displacement fields, and the differential phase fields is as follows:

$$\begin{cases} \varepsilon_{yy}(y, z) = \frac{\partial v(y, z)}{\partial y} \\ \varepsilon_{zz}(y, z) = \frac{\partial w(y, z)}{\partial z} = \frac{\lambda_c}{4\pi n} \cdot \frac{\partial \Delta\phi(y, z)}{\partial z} \end{cases}$$

where $\varepsilon_{yy}(y, z)$ represents the tangential strain field, $\varepsilon_{zz}(y,z)$ represents the axial strain field, $v(y, z)$ represents the tangential displacement field, $w(y, z)$ represents the axial displacement field, $\lambda_c$ represents a central wavelength of an optical coherence tomography (OCT) system, and n represents a refractive index of a measured object.

4. A strain calculation system for PhS-OCE, applied for implementing the strain calculation method for PhS-OCE according to claim 1, comprising a spectral information extraction module, a subpixel displacement tracking module, a differential phase field calculation module, and a strain field calculation module, wherein
the spectral information extraction module is configured to obtain interference spectra for various states during sample deformation, and extract spectral information comprising multiple amplitude maps and multiple phase maps from these interference spectra;
the subpixel displacement tracking module is configured to perform subpixel displacement tracking on various pixels in ROIs of the multiple amplitude maps to obtain corresponding tangential displacement fields and axial displacement fields,
the performing subpixel displacement tracking on various pixels comprising:
dividing ROIs of reference amplitude maps before deformation of the desired state of the sample into virtual grids evenly, and calculating the displacement of various grid points through subset matching;
the process of calculating the displacement of a grid point P being as follows:
selecting a reference subregion with (2M+1)×(2M+1) pixel centered at ($y_0$, $z_0$) from the reference amplitude map before deformation of the desired state of the sample, for tracking a corresponding target subregion in the deformed amplitude map after deformation of the desired state of the sample;
using, for tracking the target subregion, a cross-correlation criterion to estimate the degree of similarity between a reference subset and a target subset, with the formula as follows:

$$C_{ZNCC} = \frac{\sum_{i,j}(AR_{ij} - \mu_{AR}) \cdot (AD_{ij} - \mu_{AD})}{\sqrt{\sum_{i,j}(AR_{ij} - \mu_{AR})^2 \cdot \sum_{i,j}(AD_{ij} - \mu_{AD})^2}}$$

where $AR_{ij}$ and $AD_{ij}$ represent pixel values of the reference subset and the deformed subregion, respectively;

and $\mu_{AR}$ and $\mu_{AD}$ represent average pixels of the reference subregion and the deformed subregion, respectively; and obtaining the displacement of the grid point P after finding a target subregion with the highest similarity;

the differential phase field calculation module is configured to obtain corresponding differential phase fields based on the multiple phase maps and combined with pixel-level displacement offsets; and the strain field calculation module is configured to calculate tangential strain fields and axial strain fields by combining the tangential displacement fields, the axial displacement fields, and the differential phase fields.

5. A strain calculation system for PhS-OCE, applied for implementing the strain calculation method for PhS-OCE according to claim 2, comprising a spectral information extraction module, a subpixel displacement tracking module, a differential phase field calculation module, and a strain field calculation module, wherein the spectral information extraction module is configured to obtain interference spectra for various states during sample deformation, and extract spectral information comprising multiple amplitude maps and multiple phase maps from these interference spectra;

the subpixel displacement tracking module is configured to perform subpixel displacement tracking on various pixels in ROIs of the multiple amplitude maps to obtain corresponding tangential displacement fields and axial displacement fields, the performing subpixel displacement tracking on various pixels comprising:

dividing ROIs of reference amplitude maps before deformation of the desired state of the sample into virtual grids evenly, and calculating the displacement of various grid points through subset matching;

the process of calculating the displacement of a grid point P being as follows:

selecting a reference subregion with $(2M+1)\times(2M+1)$ pixel centered at $(y_0, z_0)$ from the reference amplitude map before deformation of the desired state of the sample, for tracking a corresponding target subregion in the deformed amplitude map after deformation of the desired state of the sample;

using, for tracking the target subregion, a cross-correlation criterion to estimate the degree of similarity between a reference subset and a target subset, with the formula as follows:

$$C_{ZNCC} = \frac{\sum_{i,j}(AR_{ij} - \mu_{AR}) \cdot (AD_{ij} - \mu_{AD})}{\sqrt{\sum_{i,j}(AR_{ij} - \mu_{AR})^2 \cdot \sum_{i,j}(AD_{ij} - \mu_{AD})^2}}$$

where $AR_{ij}$ and $AD_{ij}$ represent pixel values of the reference subset and the deformed subregion, respectively; and $\mu_{AR}$ and $\mu_{AD}$ represent average pixels of the reference subregion and the deformed subregion, respectively; and obtaining the displacement of the grid point P after finding a target subregion with the highest similarity;

the differential phase field calculation module is configured to obtain corresponding differential phase fields based on the multiple phase maps and combined with pixel-level displacement offsets; and the strain field calculation module is configured to calculate tangential strain fields and axial strain fields by combining the tangential displacement fields, the axial displacement fields, and the differential phase fields.

6. A strain calculation system for PhS-OCE, applied for implementing the strain calculation method for PhS-OCE according to claim 3, comprising a spectral information extraction module, a subpixel displacement tracking module, a differential phase field calculation module, and a strain field calculation module, wherein the spectral information extraction module is configured to obtain interference spectra for various states during sample deformation, and extract spectral information comprising multiple amplitude maps and multiple phase maps from these interference spectra;

the subpixel displacement tracking module is configured to perform subpixel displacement tracking on various pixels in ROIs of the multiple amplitude maps to obtain corresponding tangential displacement fields and axial displacement fields, the performing subpixel displacement tracking on various pixels comprising:

dividing ROIs of reference amplitude maps before deformation of the desired state of the sample into virtual grids evenly, and calculating the displacement of various grid points through subset matching;

the process of calculating the displacement of a grid point P being as follows:

selecting a reference subregion with $(2M+1)\times(2M+1)$ pixel centered at $(y_0, z_0)$ from the reference amplitude map before deformation of the desired state of the sample, for tracking a corresponding target subregion in the deformed amplitude map after deformation of the desired state of the sample;

using, for tracking the target subregion, a cross-correlation criterion to estimate the degree of similarity between a reference subset and a target subset, with the formula as follows:

$$C_{ZNCC} = \frac{\sum_{i,j}(AR_{ij} - \mu_{AR}) \cdot (AD_{ij} - \mu_{AD})}{\sqrt{\sum_{i,j}(AR_{ij} - \mu_{AR})^2 \cdot \sum_{i,j}(AD_{ij} - \mu_{AD})^2}}$$

where $AR_{ij}$ and $AD_{ij}$ represent pixel values of the reference subset and the deformed subregion, respectively; and $\mu_{AR}$ and $\mu_{AD}$ represent average pixels of the reference subregion and the deformed subregion, respectively; and obtaining the displacement of the grid point P after finding a target subregion with the highest similarity;

the differential phase field calculation module is configured to obtain corresponding differential phase fields based on the multiple phase maps and combined with pixel-level displacement offsets; and the strain field calculation module is configured to calculate tangential strain fields and axial strain fields by combining the tangential displacement fields, the axial displacement fields, and the differential phase fields.

7. The strain calculation system for PhS-OCE according to claim 4, wherein the spectral information extraction module is an OCT system.

* * * * *